United States Patent [19]

Dickow

[11] Patent Number: 5,546,788
[45] Date of Patent: Aug. 20, 1996

[54] METHOD AND APPARATUS FOR MEASURING THE CONCENTRATION OF SOLID PARTICLES (SOOT) IN THE EXHAUST GASES OF INTERNAL COMBUSTION ENGINES

[75] Inventor: Achim Dickow, Velbert, Germany

[73] Assignee: Pierburg GmbH, Neuss, Germany

[21] Appl. No.: 377,768

[22] Filed: Jan. 24, 1995

[30] Foreign Application Priority Data

Feb. 17, 1994 [DE] Germany ............................ 44 04 947.1

[51] Int. Cl.$^6$ ...................................................... G01N 37/00
[52] U.S. Cl. ............................................ 73/28.01; 73/23.33
[58] Field of Search ................................ 73/28.01, 23.33

[56] References Cited

U.S. PATENT DOCUMENTS

| | | | |
|---|---|---|---|
| 4,586,367 | 5/1986 | Lewis | 73/23.33 |
| 4,633,706 | 1/1987 | Ito et al. | 73/23.33 |
| 5,110,747 | 5/1992 | Pataschnick et al. | 73/28.01 |

FOREIGN PATENT DOCUMENTS

| | | | |
|---|---|---|---|
| 269036 | 11/1988 | Japan | 73/28.01 |
| 218436 | 9/1991 | Japan . | |
| 251218 | 8/1969 | U.S.S.R. | 73/28.01 |
| 1500904 | 8/1989 | U.S.S.R. | 73/23.33 |

*Primary Examiner*—Hezron E. Williams
*Assistant Examiner*—Daniel S. Larkin
*Attorney, Agent, or Firm*—Ladas & Parry

[57] ABSTRACT

A method and apparatus for measuring the concentration of particles in the exhaust gas of an internal combustion engine in which the exhaust gas is mixed and diluted with air in a mixing chamber (6) and supplied to a measuring filter (4) during a measurement phase. In order to establish the dilution ratio of the exhaust gas in the mixture of exhaust gases and air, valves (10, 11) are operated to supply air from an air line (13) to a bypass line (12) during a second phase. The quantity of air flow in the air line (13) is equal to the flow quantity of the exhaust gas to the mixing chamber (6). Thereby, the ratio of the quantity of particles measured by the filter (4) to the air flow in the air line (13) represents the concentration of the particles in the exhaust gas.

9 Claims, 1 Drawing Sheet

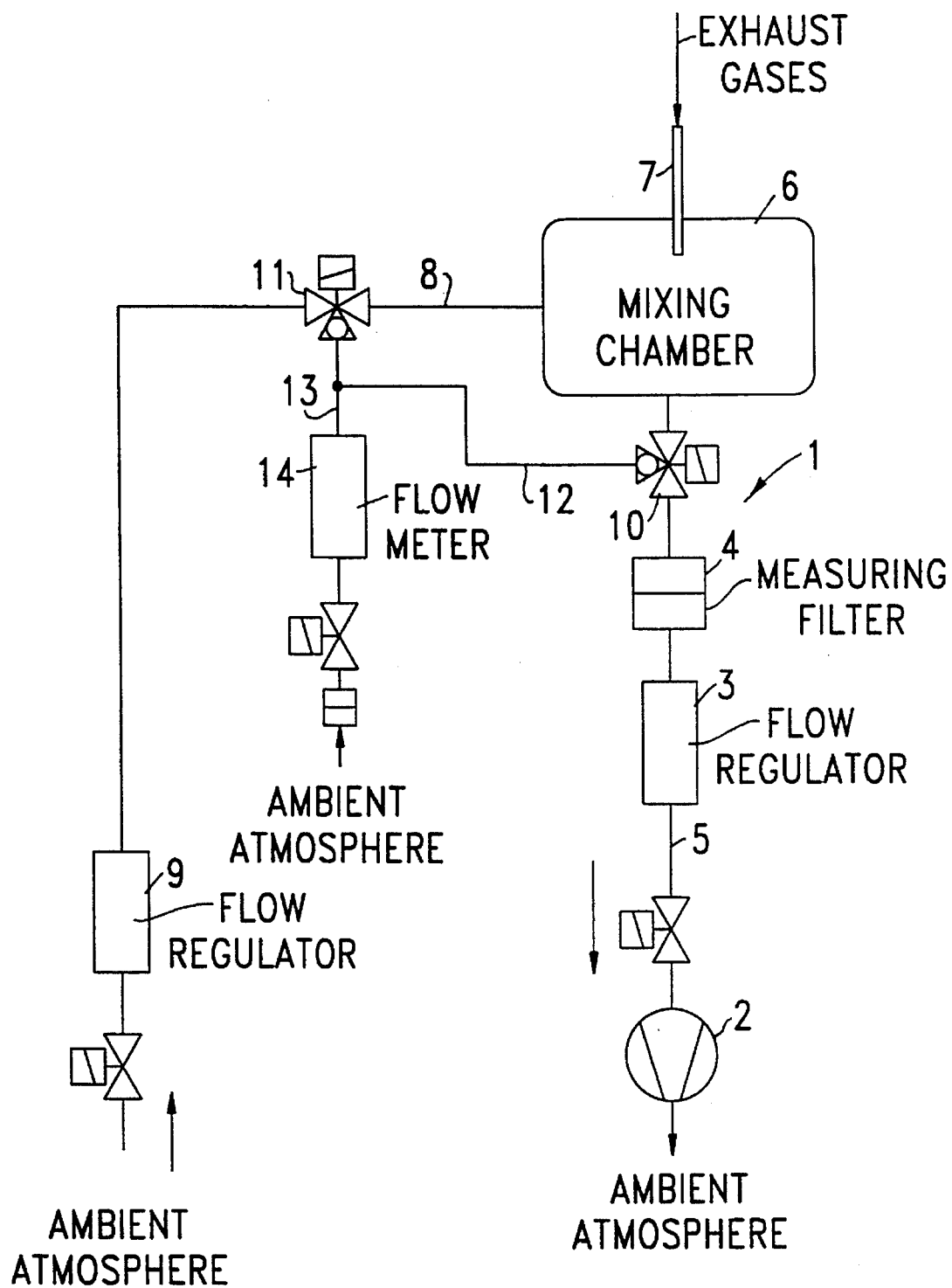

METHOD AND APPARATUS FOR MEASURING THE CONCENTRATION OF SOLID PARTICLES (SOOT) IN THE EXHAUST GASES OF INTERNAL COMBUSTION ENGINES

FIELD OF THE INVENTION

The invention relates to apparatus for measuring the concentration of solid particles, i.e. soot, in the exhaust gases of internal combustion engines.

The invention further relates to methods of measuring the concentration of the solid particles in the exhaust gases of internal combustion engines.

BACKGROUND

It is conventional in the measurement of the concentration of solid particles or soot in the exhaust gases of internal combustion engines to dilute the exhaust gases since hot exhaust gases cannot be readily measured. The dilution ratio of the exhaust gases is established on the basis of measuring the ratio of a gaseous component of the undiluted exhaust gases and the same gaseous component in the diluted exhaust gases.

This method has the disadvantage that it is necessary to measure the quantities of gaseous components which is relatively expensive even though it is only the quantity of solid particles which is desired.

SUMMARY OF THE INVENTION

An object of the invention is to provide a method and apparatus which avoids the disadvantage of the conventional practice and eliminates the need for measuring gaseous components of the undiluted and diluted exhaust gases.

A further object of the invention is to provide such method and apparatus in which essentially the quantity of solid particles is measured.

In accordance with the invention, a sample of engine exhaust gases is diluted and aspirated through a measuring device in which the quantity of solid particles is measured. The actual quantity of the exhaust gases in the total quantity of aspirated gases flowing through the measuring device is determined, in a by-pass phase when the exhaust gases are cut-off, by measuring the amount of substitute outside air which replaces the exhaust gases flowing through the measuring device.

BRIEF DESCRIPTION OF THE DRAWING

The sole FIGURE of the drawing is a schematic illustration of an embodiment of the measurement apparatus according to the invention.

DETAILED DESCRIPTION

In the drawing, there is illustrated a measuring apparatus 1 comprising an air pump 2, a mass flow regulator 3 and a measuring filter 4 connected in an induction line 5 whose outlet opens downstream of the air pump 2 into the atmosphere. From the measuring filter 4 the induction line extends into a mixing chamber 6. A sample line 7 connected to an exhaust device of an internal combustion engine extends into mixing chamber 6 to supply thereto a sample of hot exhaust gases from the internal combustion engine. Also opening into the mixing chamber 6 is an air line 8 having an inlet connected to ambient atmosphere. A mass flow regulator 9 is provided in the air line 8. The exhaust gases in sample line 7 are diluted and cooled in mixing chamber 6 with the air from air line 8. The air pump 2 serves as a means to aspirate the mixed exhaust gases and air from the mixing chamber 6 to and through filter 4 and flow regulator 3 for discharge to the atmosphere.

Up to this point, the measuring device 1 corresponds to the conventional state of the art, in which the mass flow regulator 3 in induction line 5 is adjusted to a specific mass flow and the second mass flow regulator 9 in the air line 8 is adjusted to a mass flow that is less than that in the first mass flow regulator 3.

The difference between the two mass flows represents the mass flow of the exhaust sample supplied by sample line 7. Although the mass flow regulators 3, 9 operate with very small tolerances, they cause significant measurement error of the quantity of exhaust sample when calculating the dilution ratio of the exhaust sample in the mass flow in the measurement filter 4.

In order to avoid this deficiency and provide precise indication of the dilution ratio of the exhaust gases in the total mass flow in the measuring filter 4, according to the invention, on-off switching valves 10, 11 are provided upstream and downstream of mixing chamber 6 respectively in the air line 8 and the induction line 5. The valves 10, 11 are joined by a bypass line 12 which bypasses mixing chamber 6. By selectively operating the valves 10, 11, the air line 8 is selectively connected to mixing chamber 6 or to bypass line 12 thereby bypassing or short-circuiting the mixing chamber 6. The bypass line 12 is connected to an additional air line 13 having an inlet opening to the ambient atmosphere and containing a mass flow meter 14. The valves 10, 11, bypass line 12 and air line 13 serve as a means for halting the flow of exhaust gases to the air induction line 5 and replacing said flow with an equal flow of air alone.

Thus, by comparison of the bypass air flow indicated by mass flow meter 14, which is determined in a highly precise manner by the mass flow meter 14 independently of the tolerance-conditioned fluctuations of the mass flows in the lines 5 and 8, the flow quantity of the exhaust sample can be determined by suitable switching of the on-off valves 10, 11. In this way, the mass flow of the exhaust sample in line 7 can be taken as equal to the air flow measured in the flow meter 14 and the concentration of the particles in the exhaust gas sample is the ratio of the measurement of the particles in the measurement filter 4 and the air flow measured in the flow meter 14.

In accordance with the invention, in a first stage of operation representing a particle measurement phase, valve 11 is open in air line 8 and is closed to bypass line 12 and valve 10 is open in air line 5 and is closed to bypass line 12. In this measurement phase, the exhaust gases in sample line 7 are mixed in mixing chamber 6 with air in line 8 and the mixed and diluted exhaust gases are supplied to measurement filter 4 in induction line 5 where the quantity of soot particles is measured. In order to determine the dilution ratio of the exhaust gases in the mass flow through the measuring filter 4, the measuring device is placed into a second stage in which valve 11 closes off air line 8 to mixing chamber 6 and opens up air line 8 to the bypass line 12 while valve 10 closes off induction line 5 to mixing chamber 6 and opens up induction line 5 to bypass line 12. In this stage, the air flow measured in mass flow meter 14 in air line 13 is equal to the mass flow of the exhaust gases in sample line 7 during the first measurement phase and the concentration of the particles in the exhaust gas is determined from the ratio of the quantity of solid particles measured by measurement filter 4 to the mass flow of the air measured in meter 14.

Although the invention is disclosed with reference to a particular embodiment thereof, it will become apparent to those skilled in the art that numerous modifications and variations can be made which will fall within the scope and spirit of the invention as defined by the attached claims.

What is claimed is:

1. Apparatus for determining the concentration of particles in exhaust gases of an internal combustion engine comprising:

a mixing chamber, a sample line connected to said mixing chamber to supply a flow of exhaust gases to said mixing chamber from an internal combustion engine, an air line connected to said mixing chamber to supply air to the mixing chamber to mix with and dilute the exhaust gases in the mixing chamber while cooling the exhaust gases, an air induction line connected to the mixing chamber including means to aspirate the mixed exhaust gases and air from the mixing chamber, a measurement filter in said air induction line to measure the amount of particles in the mixed exhaust gases and air in the air induction line coming from the mixing chamber, a first valve in said air line upstream of the mixing chamber and a second valve in said air induction line downstream of said mixing chamber, a bypass line connected to said air line and said air induction line respectively by said first and second valves, said first and second valves having respective open and closed states to establish respective first and second operation stages, said bypass line in said first stage being closed-off so that air in said air line flows into said mixing chamber and mixed exhaust gases and air flow from the mixing chamber through the measurement filter in said air induction line, said bypass line in said second stage being connected to said air line and said air induction line to bypass the mixing chamber, a second air line connected to supply a flow of air to said bypass line during said second stage in an amount which is substantially equal to the flow of exhaust gases to said mixing chamber during said first stage, and a meter for measuring mass flow of air in said second air line.

2. Apparatus as claimed in claim 1, wherein said first and second valves are on-off valves.

3. Apparatus as claimed in claim 2, comprising flow regulators respectively in said air line and said air induction line.

4. Apparatus as claimed in claim 3, wherein said air induction line has an outlet which is open to ambient atmosphere and said second air line has an inlet which is also open to ambient atmosphere.

5. Apparatus for determining the concentration of particles in exhaust gases of an internal combustion engine comprising:

a mixing chamber, a sample line connected to said mixing chamber to supply a flow of exhaust gases to said mixing chamber from an internal combustion engine, an air line connected to said mixing chamber to supply air to the mixing chamber to mix with and dilute the exhaust gases in the mixing chamber while cooling the exhaust gases, an air induction line connected to the mixing chamber including means to aspirate the mixed exhaust gases and air from the mixing chamber, a measurement filter in said air induction line to measure the amount of particles in the mixed exhaust gases and air in the air induction line coming from the mixing chamber, means for halting the flow of exhaust gases to said air induction line and replacing said flow with an equal flow of air alone, and a meter for measuring said equal flow of air.

6. Apparatus as claimed in claim 5, wherein said means for halting the flow of exhaust gases to said air induction line and replacing said flow with an equal amount of air alone comprises a bypass line connected to said air line and said air induction line to bypass said mixing chamber and valve means for selectively controlling flow of air through the bypass line.

7. Apparatus as claimed in claim 6, wherein said means for halting the flow of exhaust gases to said air induction line and replacing said flow with an equal amount of air alone, further comprises a second air line connected to supply said equal flow of air to said bypass line, said meter being in said second air line.

8. A method for determining the concentration of particles in exhaust gases of an internal combustion engine comprising:

supplying a flow of exhaust gases to a mixing chamber from an internal combustion engine, supplying air to the mixing chamber to mix with and dilute the exhaust gases in the mixing chamber while cooling the exhaust gases, aspirating the mixed exhaust gases and air from the mixing chamber into an induction line, measuring an amount of particles in the mixed exhaust gases and air coming from the mixing chamber in a first stage of operation, bypassing the mixing chamber in a second stage of operation so that air is directly aspirated into the induction line in an amount corresponding to the flow of the exhaust gases and air coming from the mixing chamber into said induction line during said first stage of operation, supplying a second flow of air to said bypass line during said second stage of operation in an amount substantially equal to the flow of exhaust gases to said mixing chamber during said first stage of operation, and measuring mass flow of said second flow of air during said second stage of operation to obtain the concentration of the solid particles in exhaust gases as the ratio of the amount of particles measured in said first stage of operation to the mass flow of said second flow of air measured in said second stage of operation.

9. A method as claimed in claim 8, comprising equalizing the air flow to said mixing chamber during said first stage of operation and to said bypass line during said second stage of operation, and equalizing the flow aspirated in the induction line during the first and second stages of operation.

* * * * *